US012757164B2

(12) United States Patent
Yang et al.

(10) Patent No.: US 12,757,164 B2
(45) Date of Patent: Oct. 6, 2026

(54) SIGNAL OR CHANNEL DETECTION METHOD AND APPARATUS, TERMINAL, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Tuo Yang, Beijing (CN); Lijie Hu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 362 days.

(21) Appl. No.: 18/293,338

(22) PCT Filed: Jul. 27, 2022

(86) PCT No.: PCT/CN2022/108362
§ 371 (c)(1),
(2) Date: Jan. 29, 2024

(87) PCT Pub. No.: WO2023/005995
PCT Pub. Date: Feb. 2, 2023

(65) Prior Publication Data

US 2024/0349239 A1 Oct. 17, 2024

(30) Foreign Application Priority Data

Jul. 30, 2021 (CN) ........................ 202110871006.6

(51) Int. Cl.
*H04W 68/02* (2009.01)

(52) U.S. Cl.
CPC .................................. *H04W 68/02* (2013.01)

(58) Field of Classification Search
CPC ............... H04W 68/02; H04W 68/025; H04W 52/0229; H04W 68/005; H04W 52/0235
See application file for complete search history.

(56) References Cited

U.S. PATENT DOCUMENTS 11,076,383 B2 * 7/2021 Kim .................... H04W 68/025
2012/0122495 A1 * 5/2012 Weng .................. H04W 68/025 455/458

(Continued)

FOREIGN PATENT DOCUMENTS

CN 103457688 A 12/2013
CN 113056951 A 6/2021

(Continued)

OTHER PUBLICATIONS

Lenovo, Motorola Mobility, Paging enhancement for UE power saving, 3GPP TSG RAN WG1 #105, e-Meeting, May 10-27, 2021, R1-2105770 (5 pages).

(Continued)

*Primary Examiner* — Dung Hong
(74) *Attorney, Agent, or Firm* — Maginot, Moore & Beck, LLP

(57) ABSTRACT

A method for detecting a signal or channel. The method includes determining a detection parameter for a signal or a channel of the terminal based on a paging configuration parameter of the terminal. The signal or first channel is configured to indicate whether the terminal detects a paging. A terminal and a non-transitory computer-readable storage medium are also provided.

12 Claims, 2 Drawing Sheets

(56) References Cited

U.S. PATENT DOCUMENTS

| | | | | |
|---|---|---|---|---|
| 2022/0200675 | A1 | 6/2022 | Raghavan | |
| 2023/0075197 | A1* | 3/2023 | Xu | H04L 5/0048 |
| 2023/0108646 | A1* | 4/2023 | Tseng | H04W 68/025 455/458 |
| 2023/0217411 | A1* | 7/2023 | He | H04W 24/08 370/329 |
| 2024/0007252 | A1* | 1/2024 | He | H04L 5/005 |
| 2024/0080801 | A1* | 3/2024 | Andgart | H04W 68/02 |
| 2024/0137909 | A1* | 4/2024 | Liu | H04B 7/0626 |
| 2024/0381307 | A1* | 11/2024 | Reial | H04W 68/005 |
| 2024/0422737 | A1* | 12/2024 | Zhao | H04W 52/0229 |

FOREIGN PATENT DOCUMENTS

| | | | | |
|---|---|---|---|---|
| CN | 113163476 | A | 7/2021 | |
| CN | 113170282 | A | 7/2021 | |
| WO | WO-2022007844 | A1 * | 1/2022 | H04W 68/025 |

OTHER PUBLICATIONS

ZTE, Discussion on power saving enhancements for paging, 3GPP TSG RAN WG1 #102e, e-Meeting, Aug. 17-28, 2020, R1-2005520 (8 pages).

Office Action for corresponding JP application 2024-505554, mailed Jan. 14, 2025, English and Japanese language translations (11 pages).

ISR for PCT application PCT/CN2022/108362, posted Nov. 7, 2022 (8 pages), with English Translation.

CATT, Details of PEI configuration, 3GPP TSG RAN WG1 #104-e, e-Meeting Jan. 25-Feb. 5, 2021, Agenda Item 8.7.1.3, Document R1-2100394.

Office Action for corresponding CN application No. 202110871006.6, mailed Apr. 24, 2025 (English and Chinese language document) (11 pages).

* cited by examiner

SIGNAL OR CHANNEL DETECTION METHOD AND APPARATUS, TERMINAL, AND STORAGE MEDIUM

CROSS-REFERENCE TO RELATED APPLICATION

This application is a U.S. national phase of International Application No. PCT/CN2022/108362, filed with the State Intellectual Property Office of P. R. China on Jul. 27, 2022, which is based upon and claims priority to Chinese Patent Application No. 202110871006.6, filed with the State Intellectual Property Office of P. R. China on Jul. 30, 2021, the entire contents of which are incorporated herein by reference.

TECHNICAL FIELD

The disclosure relates to a field of wireless technologies, and more particularly to a method and an apparatus for detecting a signal or channel, a terminal, and a storage medium.

BACKGROUND

In the related art, it is indicated by a paging early indication (PEI) whether a terminal needs to detect a paging physical downlink control channel (PDCCH) and a corresponding physical downlink shared channel (PDSCH). However, the terminal in an idle state or inactive state may not receive terminal-specific configuration information, and the terminal may merely determine a terminal-specific PEI detection parameter based on broadcast configuration information on a network side.

SUMMARY

Embodiments of the disclosure provide a method for detecting a signal or channel, performed by a terminal, including:

determining a detection parameter for a signal or a channel of the terminal based on a paging configuration parameter of the terminal.

The signal or the channel is configured to indicate whether the terminal detects a paging.

Embodiments of the disclosure also provide a terminal, including: a processor, and a communication interface.

The processor is configured to determine a detection parameter for a signal or a channel of the terminal based on a paging configuration parameter of the terminal.

The signal or the channel is configured to indicate whether the terminal detects a paging.

Embodiments of the disclosure also provide a non-transitory computer-readable storage medium having a computer program stored thereon. The computer program is executed by a processor to implement steps in any of the above methods.

DETAILED DESCRIPTION

Figure 1:
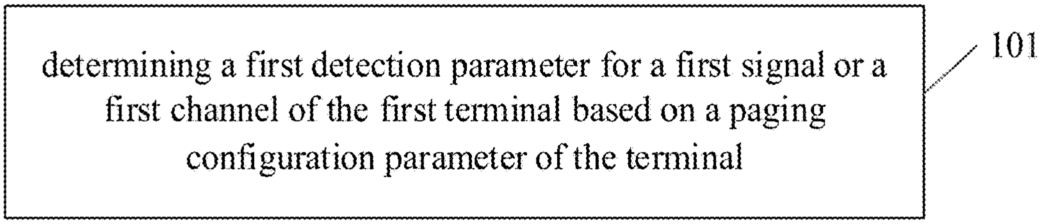
FIG. 1 is a flow chart illustrating a method for detecting a signal or channel according to an embodiment of the disclosure.

In the new radio (NR), a terminal detects a paging message in a discontinuous reception (DRX) way. The terminal detects one paging occasion (PO) in each DRX period, in which one PO refers to a group of PDCCH detection opportunities, including multiple time slots. In a practical application, the PDCCH (hereinafter referred to as paging PDCCH) indicating the paging message transmitted on the PO may be scrambled by a paging radio-network temporary identifier (P-RNTI). A paging frame (PF) may include one or more POs. The PF satisfies a formula of (SFN+PF_offset) mod T=(T div N)*(UE_ID mod N). In addition, the terminal queries PO through an index i_s: i_s=floor (UE_ID/N) mod Ns. SFN represents a system frame number, PF_offset represents an offset value for calculating the PF, T represents a DRX period of the terminal, N represents the number of PFs included in the period T, and Ns represents the number of POs included in one PF, and UE_ID is equal to 5G-S-TMSI mod 1024. Here, S-TMSI is a system architecture evolution (SAE) temporary mobile station identifier, and 5G-S-TMSI is a bit string with 48 bits defined in TS 23.501. When the terminal does not have the 5G-S-TMSI, UE_ID is equal to 0. In the above formula, N and Ns are configured by a radio resource control (RRC).

Based on such NR paging design, terminals with a same or different UE_IDs may calculate a same PO position. Therefore, the terminal needs to further read the PagingRecordList in a physical downlink shared channel (PDCCH) scheduled by the paging PDCCH after detecting the paging PDCCH, and to determine whether the PagingUE-Identity in the PagingRecordList matches the 5G-S-TMSI or full I-RNTI of the terminal. In this way, it is determined whether the terminal is paged. In other words, the terminal also needs to detect the PDCCH scheduled by the PDCCH transmitted on the PO, to determine whether there is really a paging message. In a practical application, even if only one of terminals corresponding to one PO needs to be paged, all the terminals corresponding to the PO need to detect the paging PDSCH and the corresponding PDSCH. Such detection actions are meaningless to a terminal that does not need to be paged, which may cause a terminal in an idle state or an inactive state to spend too much energy on an invalid detection behavior.

In order to avoid the above problems, a paging early indication (PEI) is configured to indicate whether the terminal needs to detect the paging PDCCH and the corresponding PDCCH in the related art. Presently, the NR may configure multiple paging parameters N and Ns, where N represents a number of PFs within a time duration T, and Ns represents a number of POs included in one PF. In a scene of a high paging density, for example, in a maximum density (ontT, NS=4), there may be one PO every 2.5 ms. When there is a one-to-one mapping relationship between the PEI and the PO, an overhead of the PEI may increase due to the high paging density. Considering that all of the PEI, the paging PDC and the corresponding PDCCH, as well as a synchronization signal block (SSB), a system message and the like are transmitted in an initial downlink band width part (BWP), such high paging density may cause a resource shortage of the initial downlink BWP. Therefore, in the scene of the high paging density, it is designed that one PEI may correspond to multiple POs, that is, one PEI indicates whether multiple POs are woken up. In a scene of a low paging density, the PEI may not generate too much overhead. In order to further improve an energy-saving gain of a paging detection of the terminal, terminals corresponding to one PO may be grouped, and one PEI may indicate whether multiple terminal groups are woken up. In this way, since the number of terminals in the terminal group is less than the number of terminals in one PO, a probability that the terminal is woken up may be further reduced, and the energy-saving gain may be improved.

Therefore, from a network side, there is a mapping relationship between the PEI and the PO, and a mapping relationship between the PEI and the terminal group. From the terminal side, one terminal may merely correspond to one PEI, but the PEI is shared with other terminals. Since the terminal in the idle state or the inactive state may merely receive public broadcast configuration information, but may not receive terminal-specific configuration information, the design of the PEI needs to consider how to enable the terminal in the idle state or the inactive state to determine the corresponding PEI. For example, when the PEI is a kind of PDCCH, how does the terminal know a position of a bit corresponding to the terminal itself in the downlink control information (DCI) format? When the PEI is a reference signal, how does the terminal know a sequence parameter corresponding to the terminal itself, such as an index of a sequence or an index of a cyclic shift?

The base station may not perform configuration for a terminal by utilizing a dedicated configuration. Meanwhile, in consideration of different mapping relationships of the N, the Ns, the PEI with the PO and the number of terminal groups, there is a need to design an implicit method for determining and detecting the PEI, such that different terminals may determine their own PEI detection parameters merely relying on public configuration parameters in a system information block (SIB).

Based on this, in embodiments of the application, based on a paging configuration parameter of a first terminal, the first terminal determines a first detection parameter for a first signal or a first channel indicating whether the terminal detects a paging. In the above solution, the terminal determines the first detection parameter for the first signal or the first channel based on the paging configuration parameter of the terminal itself, instead of determining the first detection parameter for the first signal or the first channel based on the terminal-specific configuration information sent by the network side. In this way, a configuration of the first detection parameter for the first signal or the first channel may not bring an additional signaling overhead, and the terminal may determine the first detection parameter for the first signal or the first channel when it is in the idle state or the inactive state, to perform detection on the first signal or the first channel, thereby saving energy of the terminal.

Detailed description will be further made below to the disclosure with reference accompanying drawings and embodiments.

Embodiments of the disclosure provide a method for detecting a signal or a channel, applied to a first terminal. As illustrated in FIG. 1, the method includes the following.

At block 101, a first detection parameter for a first signal or a first channel of the first terminal is determined based on a paging configuration parameter of the first terminal, The first signal or the first channel is configured to indicate whether the first terminal detects a paging.

In a practical application, the first signal or the first channel may be understood as a PEI, or another physical signal or physical channel configured to indicate whether the terminal detects the paging. The first detection parameter is a parameter configured to detect the PEI.

In an embodiment, the first detection parameter includes at least one of a bit position;

a sequence cyclic shift;

a sequence index; or a monitoring occasion.

Here, a parameter for instructing the first terminal to detect the first signal or the first channel may be determined based on the paging configuration parameter of the first terminal. In case that the first signal or the first channel is a PDCCH, the first detection parameter indicates the bit position where the first terminal detects paging indication information corresponding to the first terminal itself on the PDCCH. In case that the first signal or the first channel is a sequence, the first detection parameter indicates the sequence cyclic shift or the sequence index of a sequence corresponding to the first terminal. In case that the first signal or the first channel is multiple PDCCHs or sequences, and that one PDCCH or sequence corresponds to one PO or one terminal group, the first detection parameter indicates the corresponding monitoring occasion where the first terminal detects a corresponding PDCCH or sequence.

In an embodiment, the first detection parameter represents a parameter determined at least based on a first index of the first terminal, and the first index represents an index of a paging occasion (PO) of the terminal.

Here, the first detection parameter may represent a parameter determined at least based on the index i_s of the PO of the first terminal.

In a practical application, there is a scene where a sending period of the first signal or one first channel is the same as a sending period or a time interval of the PF, in which:

1. In case that one first signal or one first channel corresponds to one or more POs, that is, one first signal or one first channel is configured to indicate whether one or more terminals of one PO or more POs need to detect the paging, the first detection parameter of the first terminal represents the first index.

In this case, a correspondence between the index i_s and the parameter configured to detect the first signal or the first channel is predefined. In case that the first signal or the first channel is one PDCCH, i_s=0 corresponds to the first bit, and i_s=1 corresponds to the second bit, when the index of the first terminal is i_s=0, the first detection parameter indicates that the first terminal detects the PDCCH. In case that the first signal or the first channel is a sequence, i_s=0 corresponds to a cyclic shift #1, and i_s=1 corresponds to a cyclic shift #2, when the index of the first terminal is i_s=0, the first detection parameter indicates that the first terminal detects a sequence of the cyclic shift #1. In case that the first signal or the first channel is multiple PDCCHs or sequences, one PDCCH or sequence corresponds to one PO, i_s=0 corresponds to a monitoring occasion #0 of the PDCCH or sequence, and i_s=1 corresponds to a monitoring occasion #1 of the PDCCH or sequence, when the index of the first terminal is i_s=0, the first detection parameter indicates that the first terminal detects a corresponding PDCCH or sequence on a monitoring occasion #0 of the PDCCH or the sequence.

Figure 2:
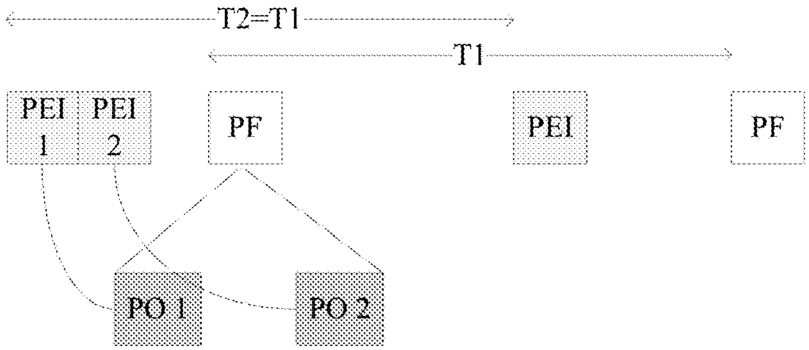
FIG. 2 is a schematic diagram illustrating a method for detecting a signal or channel according to an embodiment of the disclosure.

In combination with a detailed example of FIG. 2, as illustrated in FIG. 2, a sending period of a PF is T1, and a sending period of the first signal or the first channel, such as a PEI, is T2, and T1=T2. One PF includes a PO 1 and a PO 2, and one first signal or one first channel (PEI) corresponds to one PO. In this case, a detection parameter for the first signal or the first channel of the first terminal is determined based on the first index of the first terminal, thereby determining a monitoring occasion for the first signal or the first channel.

Figure 3:
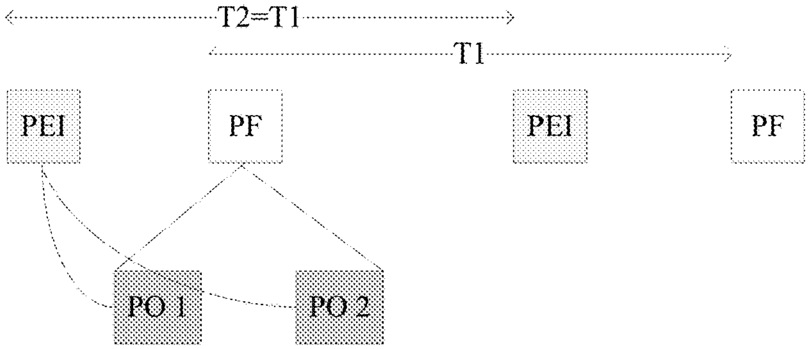
FIG. 3 is a schematic diagram illustrating a method for detecting a signal or channel according to another embodiment of the disclosure.

In combination with a detailed example of FIG. 3, as illustrated in FIG. 3, a sending period of the PF is T1, and a sending period of the first signal or the first channel, such as the PEI, is T2, and T1=T2. One PF includes a PO 1 and a PO 2, and one first signal or first channel (PEI) corresponds to two POs. In this case, a detection parameter for the first signal or the first channel of the first terminal is determined based on the first index of the first terminal, thereby determining at least one of following detection parameters for the first signal or the first channel: a bit position, a sequence cyclic shift, a sequence index, or a monitoring occasion.

2. In case that one first signal or first channel corresponds to one or more terminal groups on one or more POs, that is, one first signal or one first channel is configured to carry or indicate information whether one or more terminal groups detect the paging, the first detection parameter of the first terminal is determined based on a first index, a second index and a first number.

The second index represents an index of a corresponding terminal group to which the first terminal belongs. The first number represents the number of terminal groups. The first index represents an index of a paging occasion (PO) of the terminal.

Taking the PEI as an example, here, one first signal or one first channel (PEI) is configured to carry or indicate the information whether the one or more terminal groups detect the paging. In this case, exemplarily, the first detection parameter may be determined based on i_s*M+m, where M represents the number of terminal groups in one PO, m represents the index of a corresponding terminal group to which the first terminal belongs, and is represents the index of the PO of the terminal. In detail, a correspondence between i_s*M+m and a parameter configured to detect the first signal or the first channel is predefined. In case that the first signal or the first channel is a PDCCH and that the index of the first terminal is i_s=0, the first terminal detects a bit determined by or corresponding to 0*M+m in the PDCCH. In case that the first signal or the first channel is a sequence and that the index of the first terminal is i_s=0, the first terminal detects a sequence determined by or corresponding to a cyclic shift or a sequence index which is 0*M+m. In case that the first signal or the first channel is multiple PDCCHs or sequences, and that the index of the first terminal is i_s=0, the first terminal detects a PDCCH or a sequence on a monitoring occasion of the PDCCH or the sequence determined by or corresponding to 0*m+m.

In combination with the detailed example of FIG. 2, as illustrated in FIG. 2, the sending period of the PF is T1, and the sending period of the first signal or the first channel, such as the PEI, is T2, and T1=T2. One PF includes a PO 1 and a PO 2, and one first signal or first channel (PEI) corresponds to one PO. In this case, a detection parameter of the first terminal for the PEI is determined based on i_s*M+m, thereby determining the at least one of following detection parameters for the first signal or the first channel: a bit position, a sequence cyclic shift, a sequence index, and a monitoring occasion.

In combination with the detailed example of FIG. 3, as illustrated in FIG. 3, the sending period of the PF is T1, and the sending period of the PEI is T2, and T1=T2. One PF includes a PO 1 and a PO 2, and one PEI corresponds to two POs. In this case, a detection parameter of the first terminal for the PEI is determined based on i_s*M+m, thereby determining at least one of following detection parameters for the first signal or the first channel: a bit position, a sequence cyclic shift, a sequence index, and a monitoring occasion.

In a practical application, there is also a scene where the sending period of the first signal or the first channel is different from the sending period of the PF, in which:

1. In case that one first signal or one first channel corresponds to one or more POs, that is, one first signal or one first channel is configured to indicate whether one or more terminals of the one PO or more POs need to detect the paging, the first detection parameter of the first terminal is determined based on the first index and a first numerical value.

The first numerical value represents a value determined by a system frame number of a paging frame (PF), a first time length and a second time length. The first time length represents a time interval between adjacent first signals or adjacent first channels, and the second time length represents a time interval between adjacent PFs.

In an embodiment, the first numerical value represents a modulus of a first ratio to a second ratio. The first ratio represents a ratio of the system frame number of the PF to the second time length, and the second ratio represents a ratio of the first time length to the second time length.

Taking the PEI as an example, there is a one-to-one mapping relationship between the first signal or the first channel and the PO, and one first signal or one first channel corresponds to one PO. In this case, exemplarily, the first detection parameter may be determined based on (SFN/T1 mod K)*Ns+i_s, where SFN represents the system frame number of the PF, T1 represents the second time length, that is, the time interval between two adjacent PFs, which may also be understood as the sending period of the PF, and K represents the ratio of the first time length to the second time length. The first time length represents the time interval between the adjacent first signals or the adjacent first channels, which may also be understood as the sending period of the first signal or the first channel. In detail, a correspondence between (SFN/T1 mod K)*Ns+0 and a parameter configured to detect the first signal or the first channel is predefined. In case that the first signal or the first channel is a PDCCH, and that the index of the first terminal is i_s=0, the first terminal detects a bit corresponding to (SFN/T1 mod K)*Ns+0 in the PDCCH. In case that the first signal or the first channel is a sequence, and that the index of the first terminal is i_s=0, the first terminal detects a sequence corresponding to a cyclic shift which is (SFN/T1 mod K)*Ns+0. In case that the first signal or the first channel is multiple PDCCHs or sequences, and that the index of the first terminal is i_s=0, the first terminal detects a corresponding PDCCH or sequence on a monitoring occasion of the PDCCH or the sequence corresponding to (SFN/T1 mod K)*Ns+0.

Figure 4:
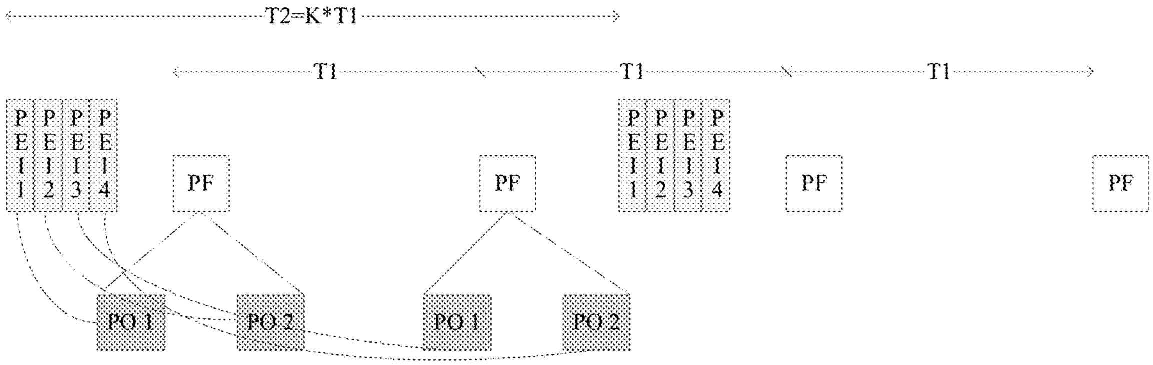
FIG. 4 is a schematic diagram illustrating a method for detecting a signal or channel according to a third embodiment of the disclosure.

In combination with a detailed example of FIG. 4, as illustrated in FIG. 4, the sending period of the PF is T1, the sending period of the first signal or the first channel (PEI) is T2, and T2=k*T1, where k represents an integer greater than 1. One PF includes a PO 1 and a PO 2, and one PEI corresponds to one PO. In this case, a detection parameter of the first terminal for the first signal or the first channel (PEI) is determined based on (SFN/T1 mod K)*Ns+i_s. In detail, Ns=2 and T=32 radio frames, that is, T=320 ms, and N=half T, that is, N=16. T1=2 radio frames, that is, T1=20 ms. It is assumed that T2=40 ms, then K=2, SFN of the PF1=0 and SFN of the PF2=2. In case that a value determined by the first terminal based on (SFN/T1 mod K)*Ns+i_s is 0, the terminal detects a PDCCH at a monitoring occasion corresponding to the index 0. Similarly, in case that a value determined by the first terminal based on (SFN/T1 mod K)*Ns+i_s is 1, the terminal detects a PDCCH at a monitoring occasion corresponding to the index 1. In case that a value determined by the first terminal based on (SFN/T1 mod K)*Ns+i_s is 2, the terminal detects a PDCCH at a monitoring occasion corresponding to the index 2. In case that a value determined by the first terminal based on (SFN/T1 mod K)*Ns+i_s is 3, the terminal detects the PDCCH at a monitoring occasion corresponding to the index 3.

Figure 5:
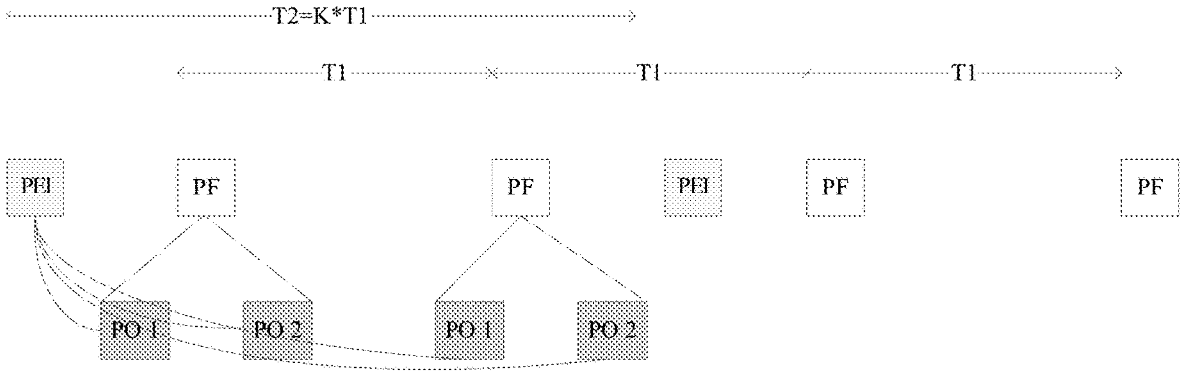
FIG. 5 is a schematic diagram illustrating a method for detecting a signal or channel according to a fourth embodiment of the disclosure.

In combination with a detailed example of FIG. 5, as illustrated in FIG. 5, the sending period of the PF is T1, the sending period of the first signal or the first channel (PEI) is T2, and T2=K*T1, where K represents an integer greater than 1. One PF includes a PO 1 and a PO 2, and one PEI corresponds to multiple POs. In this case, a detection parameter of the first terminal for the first signal or the first channel (PEI) is determined based on (SFN/T1 mod K)*Ns+i_s. In detail, Ns=2, and T=32 radio frames, that is, T=320 ms. N=half T, that is, N=16. T1=2 radio frames, that is, T1=20 ms. It is assumed that T2=40 ms, then K=2, the SFN of the PF1=0, and the SFN of the PF2=2. In case that a value determined by the first terminal based on (SFN/T1 mod K)*Ns+i_s is 0, the terminal detects a bit corresponding to the index 0 in the PDCCH, or a sequence corresponding to a cyclic shift corresponding to the index 0. Similarly, in case that a value determined by the first terminal based on (SFN/T1 mod K)*Ns+i_s is 1, the terminal detects a bit corresponding to the index 1 in the PDCCH, or a sequence corresponding to a cyclic shift corresponding to the index 1. In case that a value determined by the first terminal based on (SFN/T1 mod K)*Ns+i_s is 2, the terminal detects a bit corresponding to the index 2 in the PDCCH, or a sequence corresponding to a cyclic shift corresponding to the index 2. In case that a value determined by the first terminal based on (SFN/T1 mod K)*Ns+i_s is 3, the terminal detects a bit corresponding to the index 3 in the PDCCH, or a sequence corresponding to a cyclic shift corresponding to the index 3.

2. In case that one first signal or one first channel corresponds to one or more terminal groups on one or more POs, that is, one first signal or one first channel is configured to carry or indicate the information whether one or more terminal groups detect the paging, the first detection parameter of the first terminal is determined based on the first index, the first numerical value, the second index and the first number.

The first numerical value represents the value determined by the system frame number of the paging frame (PF), the first time length and the second time length. The second index represents an index of a corresponding terminal group to which the first terminal belongs. The first number represents the number of terminal groups, the first time length represents the sending period of the signal or channel, or the time interval between adjacent signals or adjacent channels, and the second time length represents the time interval between adjacent PFs.

In an embodiment, the first numerical value represents the modulus of the first ratio to the second ratio. The first ratio represents the ratio of the system frame number of the PF to the second time length, and the second ratio represents the ratio of the first time length to the second time length.

In an embodiment, the method also includes:

receiving the second ratio or the first time length configured through a system message by a network side Taking the PEI as an example. Here, one first signal or one first channel (PEI) is configured to carry or indicate the information whether one or more terminal groups detect the paging. In this case, exemplarily, the first detection parameter may be determined based on [(SFN/T1 mod K)*Ns+i_s]*M+m, where SFN represents the system frame number of the PF; T1 represents the second time length, that is, the time interval between two adjacent PFs, which may also be understood as the sending period of the PF; K represents the ratio of the first time length to the second time length, in which, the first time length represents the time interval between the adjacent first signals or the adjacent first channels, which may also be understood as the sending period of the first signal or the first channel; M represents the number of terminal groups in one PO; and m represents the index of a corresponding terminal group to which the first terminal belongs. In detail, a correspondence between [(SFN/T1 mod K)*Ns+i_s]*M+m and a parameter configured to detect the first signal or the first channel is predefined. In case that the first signal or the first channel is one PDCCH and that the index of the first terminal is i_s=0, the first terminal detects the PDCCH at a bit corresponding to [(SFN/T1MODK)*ns+0]. In case that the first signal or the first channel is a sequence and that the index of the first terminal is i_s=0, the first terminal detects a sequence of a cyclic shift corresponding to [(SFN/T1 mod K)*Ns+0]*M+m. In case that the first signal or the first channel is multiple PDCCHs or sequences, that one PDCCH or sequence corresponds to one PO, and that the index of the first terminal is i_s=0, the first terminal detects a PDCCH or a sequence at a monitoring occasion of the PDCCH or the sequence corresponding to [(SFN/T1 mod K)*Ns+0]*M+m.

In combination with the detailed example of FIG. 4, as illustrated in FIG. 4, the sending period of the PF is T1, and the sending period of the PEI is T2, and T2=K*T1, where K represents an integer greater than 1. One PF includes a PO 1 and a PO 2, and one PEI corresponds to one PO. In this case, a detection parameter for the first signal or the first channel corresponding to the first terminal is determined based on [(SFN/T1 mod K)*Ns+i_s]*M+m.

In combination with the detailed example of FIG. 5, as illustrated in FIG. 5, the sending period of the PF is T1, and the sending period of the PEI is T2, and T2=K*T1, where K represents an integer greater than 1. One PF includes a PO 1 and a PO 2, and one PEI corresponds to four POs on two PFs. In this case, a detection parameter for the first signal or the first channel corresponding to the first terminal is determined based on [(SFN/T1 mod K)*Ns+i_s]*M+m.

In embodiments of the disclosure, the first terminal determines the first detection parameter for the first signal or the first channel indicating whether the first terminal detects the paging based on the paging configuration parameter of the first terminal. In the above solution, the terminal determines the first detection parameter for the first signal or the first channel based on the paging configuration parameter of the terminal itself, instead of determining the first detection parameter for the first signal or the first channel based on the terminal-specific configuration information issued by the network side. In this way, the configuration of the first detection parameter for the first signal or the first channel does not need any terminal-specific configuration information, and no additional signaling overhead may be brought. Moreover, the terminal may determine the first detection parameter for the first signal or the first channel when it is in the idle state or the inactive state. Therefore, the energy of the terminal may be saved.

Figure 6:
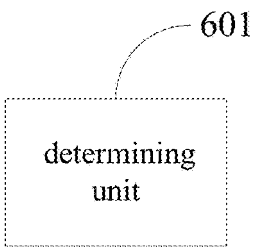
FIG. 6 is a block diagram illustrating an apparatus for detecting a signal or channel according to an embodiment of the disclosure.

To implement the method according to embodiments of the disclosure, embodiments of the disclosure also provide an apparatus for detecting a signal or channel, disposed in the first terminal. As illustrated in FIG. 6, the apparatus includes a determining unit 601.

The determining unit 601 is configured to determine a first detection parameter for a first signal or a first channel of the first terminal based on a paging configuration parameter of the first terminal.

The first signal or the first channel is configured to indicate whether the terminal detects a paging.

In an embodiment, the first detection parameter includes at least one of:

a bit position;

a sequence cyclic shift;

a sequence index; or a monitoring occasion.

In an embodiment, the first detection parameter represents a parameter determined at least based on a first index of the first terminal, and the first index represents an index of a paging occasion (PO) of the terminal.

In an embodiment, the first detection parameter of the first terminal represents the first index; or, the first detection parameter of the first terminal is determined based on the first index, a second index and a first number.

The second index represents an index of a corresponding terminal group to which the first terminal belongs, and the first number represents the number of terminal groups.

In an embodiment, the first detection parameter of the first terminal is determined based on the first index, the second index and the first number by:

calculating a sum of a first product and the second index as the first detection parameter, in which the first product is a product of the first index and the first number.

In an embodiment, the first detection parameter of the first terminal is determined based on the first index and a first numerical value; or, the first detection parameter of the first terminal is determined based on the first index, the first numerical value, the second index and the first number.

The first numerical value represents a value determined by a system frame number of a paging frame (PF), a first time length and a second time length. The second index represents an index of a corresponding terminal group to which the first terminal belongs, the first number represents the number of terminal groups, the first time length represents a time interval between adjacent first signals or adjacent first channels, and the second time length represents a time interval between adjacent PFs.

In an embodiment, the first numerical value represents a modulus of a first ratio to a second ratio.

The first ratio represents a ratio of the system frame number of the PF to the second time length, and the second ratio represents a ratio of the first time length to the second time length.

In an embodiment, the apparatus also includes:

a receiving unit, configured to receive the second ratio or the first time length configured through a system message by a network side.

In a practical application, the determining unit 601 may be implemented though a processor in the apparatus for detecting the signal or channel, and the receiving unit may be implemented through the communication interface in the apparatus for detecting the signal or channel.

It should be noted that, the apparatus for detecting the signal or channel provided in the above embodiments merely illustrates a division of the above program modules when detecting the signal or channel. In a practical application, the above processing allocation may be completed by different program modules as needed, that is, an internal structure of the apparatus is divided into different program modules to complete all or part of the above processing. In addition, the apparatus for detecting the signal or channel provided in the above embodiments belongs to a same concept as the method for detecting the signal or channel in the method embodiments, and a detailed implementation process can be referred to the method embodiments, which is not elaborated here.

Figure 7:
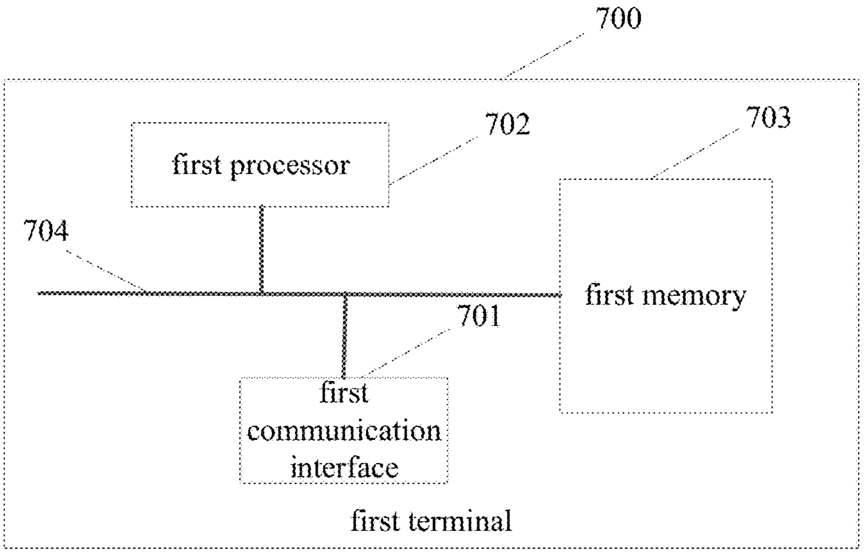
FIG. 7 is a block diagram illustrating a first terminal according to an embodiment of the disclosure.

Based on the hardware implementation of the above program modules, and in order to implement the method performed by the first terminal side in embodiments of the disclosure, embodiments of the disclosure also provide a first terminal. As illustrated in FIG. 7, the first terminal 700 includes:

a first communication interface 701, capable of performing information interaction with another network node; and a first processor 702, connected with the first communication interface 701, to implement the information interaction with another network node, and configured to perform the methods provided by one or more technical solutions in the first terminal side when executing a computer program. The computer program is stored on a first memory 703.

In detail, the first processor 702 is configured to determine a first detection parameter for a first signal or a first channel of the first terminal based on a paging configuration parameter of the first terminal.

The first signal or the first channel is configured to indicate whether the terminal detects a paging.

In an embodiment, the first detection parameter includes at least one of a bit position;

a sequence cyclic shift;

a sequence index; or a monitoring occasion.

In an embodiment, the first detection parameter represents a parameter determined at least based on a first index of the first terminal; and the first index represents an index of a paging occasion (PO) of the first terminal.

In an embodiment, the first detection parameter of the first terminal represents the first index; or, the first detection parameter of the first terminal is determined based on the first index, a second index and a first number.

The second index represents an index of a corresponding terminal group to which the first terminal belongs, and the first number represents the number of terminal groups.

In an embodiment, the first detection parameter of the first terminal is determined based on the first index, the second index and the first number by:

calculating a sum of a first product and the second index as the first detection parameter, in which the first product is a product of the first index and the first number.

In an embodiment, the first detection parameter of the first terminal is determined based on the first index and a first numerical value; or, the first detection parameter of the first terminal is determined based on the first index, the first numerical value, the second index and the first number.

The first numerical value represents a value determined by a system frame number of a paging frame (PF), a first time length and a second time length, the second index represents an index of a corresponding terminal group to which the first terminal belongs. The first number represents the number of terminal groups, the first time length represents a time interval between adjacent first signals or adjacent first channels, and the second time length represents a time interval between adjacent PFs.

In an embodiment, the first numerical value represents a modulus of a first ratio to a second ratio.

The first ratio represents a ratio of the system frame number of the PF to the second time length, and the second ratio represents a ratio of the first time length to the second time length.

In an embodiment, the first processor 702 is configured to:

receive the second ratio or the first time length configured through a system message by a network side.

It should be noted that, detailed processing procedures of the first processor 702 and the first communication interface 701 may be understood with reference to the above method.

Of course, in a practical application, various components in the first terminal 700 are coupled together through a bus system 704. It may be understood that, the bus system 704 is configured to implement connection communication between these components. The bus system 704 includes a data bus, a power bus, a control bus and a state signal bus. However, for the sake of clarity, various buses are labeled as the bus system 704 in FIG. 7.

In embodiments of the disclosure, the first memory 703 is configured to store various types of data to support the operation of the first terminal 700. Examples of such data include any computer program configured to be executed on the first terminal 700.

The method disclosed in embodiments of the disclosure may be applied to the first processor 702 or implemented by the first processor 702. The first processor 702 may be an integrated circuit chip with a signal processing capability. In an implementation process, each step of the above method may be completed by an integrated logic circuit of hardware or instructions in the form of software in the first processor 702. The first processor 702 above may be a general processor, a digital signal processor (DSP), or other programmable logic devices, discrete gate or transistor logic devices, discrete hardware components, and the like. The first processor 702 may implement or execute the methods, steps and logic blocks disclosed in embodiments of the disclosure. The general processor may be a microprocessor or any conventional processor, etc. The steps of the method disclosed in embodiments of the disclosure may be executed and completed by a hardware decoding processor which is embodied directly or by a combination of hardware and software modules in the decoding processor. The software module may be located in a storage medium. The storage medium is located in the first memory 703. The first processor 702 reads the information in the first memory 703, and completes the steps of the above method in combination with the hardware.

In an exemplary embodiment, the first terminal 700 may be implemented by one or more application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic component, for executing the above method.

It may be understood that, the memories (the first memory 703, the second memory 1303, and the third memory 1403) of embodiment of the disclosure may be volatile or nonvolatile memories, and may also include both the volatile and nonvolatile memories. The nonvolatile memory may be a read only memory (ROM), a programmable read only memory (PROM), an erasable programmable read only memory (EPROM), an electrically erasable programmable read-only memory (EEPROM), a ferromagnetic random access memory (FRAM), a flash memory, a magnetic surface memory, an optical disk, or a compact disc read-only memory (CD-ROM). The magnetic surface memory may be a magnetic disk memory or a magnetic tape memory. The volatile memory may be a random access memory (RAM), which is used as an external cache. By way of illustration, but not limitation, multiple forms of RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM), and a direct rambus random access memory (DRRAM). The memories described in embodiments of the disclosure are intended to include, but not limited to, these and any other suitable types of memories.

In an exemplary embodiment, embodiments of the disclosure also provide a storage medium, that is, a computer storage medium, specifically a computer-readable storage medium. For example, the storage medium includes the first memory 703 storing the computer program. The above computer program may be executed by the first processor 702 of the first terminal 700 to complete the steps of the method in the first terminal side. The computer-readable storage medium may be a memory such as the FRAM, the ROM, the PROM, the EPROM, the EEPROM, the flash memory, the magnetic surface memory, the optical disk, the CD-ROM or the like.

It should be noted that, the term "first" and "second" are used to distinguish similar objects, and are not necessarily used to describe a specific order or sequence.

In addition, the technical solutions described in embodiments of the disclosure may be arbitrarily combined without conflict.

The above is only a preferable embodiment of the disclosure, and is not used to limit the protection scope of the disclosure.

The invention claimed is:

1. A method for detecting a signal or channel, performed by a terminal, comprising;

determining a detection parameter for a signal or a channel of the terminal based on a paging configuration parameter of the terminal, wherein the signal or first channel is configured to indicate whether the terminal detects a paging; and wherein either:

the detection parameter of the terminal is determined based on a first index, a second index and a first number, where the first index represents an index of a paging occasion (PO) of the terminal, the second index represents an index of a terminal group to which the terminal belongs, and the first number represents a number of terminal groups; or the detection parameter of the terminal is determined based on the first index and a numerical value; or, the detection parameter of the terminal is determined based on the first index, a numerical value, the second index and a first number, wherein the numerical value represents a value determined by a system frame number of a paging frame (PF), a first time length and a second time length, the second index represents an index of a terminal group to which the terminal belongs, the first number represents a number of terminal groups, the first time length represents a time interval between adjacent signals or adjacent channels, and the second time length represents a time interval between adjacent PFs.

2. The method of claim 1, wherein the detection parameter comprises at least one of:

a bit position;

a sequence cyclic shift;

a sequence index; or a monitoring occasion.

3. The method of claim 1, wherein the detection parameter of the terminal is determined based on the first index, the second index and the first number by:

calculating a sum of a first product and the second index as the detection parameter, wherein the first product is a product of the first index and the first number.

4. The method of claim 1, wherein the numerical value represents a modulus of a first ratio to a second ratio, wherein the first ratio represents a ratio of the system frame number of the PF to the second time length, and the second ratio represents a ratio of the first time length to the second time length.

5. The method of claim 4, further comprising:

receiving the second ratio or the first time length configured through a system message by a network side.

6. A terminal, comprising: a processor, and a communication interface, wherein the processor is configured to determine a detection parameter for a signal or a channel of the terminal based on a paging configuration parameter of the terminal, wherein the signal or the channel is configured to indicate whether the terminal detects a paging; and wherein either:

the detection parameter of the terminal is determined based on a first index, a second index and a first number, where the first index represents an index of a paging occasion (PO) of the terminal, the second index represents an index of a terminal group to which the terminal belongs, and the first number represents a number of terminal groups; or the detection parameter of the terminal is determined based on the first index and a numerical value; or, the detection parameter of the terminal is determined based on the first index, a numerical value, the second index and a first number, wherein the numerical value represents a value determined by a system frame number of a paging frame (PF), a first time length and a second time length, the second index represents an index of a terminal group to which the terminal belongs, the first number represents a number of terminal groups, the first time length represents a time interval between adjacent signals or adjacent channels, and the second time length represents a time interval between adjacent PFs.

7. The terminal of claim 6, wherein the detection parameter comprises at least one of:

a bit position;

a sequence cyclic shift;

a sequence index; or a monitoring occasion.

8. The terminal of claim 6, wherein the detection parameter of the terminal is determined based on the first index, the second index and the first number by:

calculating a sum of a first product and the second index as the detection parameter, wherein the first product is a product of the first index and the first number.

9. The terminal of claim 6, wherein the numerical value represents a modulus of a first ratio to a second ratio, wherein the first ratio represents a ratio of the system frame number of the PF to the second time length, and the second ratio represents a ratio of the first time length to the second time length.

10. The terminal of claim 9, wherein the processor is further configured to:

receive the second ratio or the first time length configured through a system message by a network side.

11. A non-transitory computer-readable storage medium having a computer program stored thereon, wherein the computer program is executed by a processor to implement:

determining a detection parameter for a signal or a channel of the terminal based on a paging configuration parameter of the terminal, wherein the signal or first channel is configured to indicate whether the terminal detects a paging; and wherein either:

the detection parameter of the terminal is determined based on a first index, a second index and a first number, where the first index represents an index of a paging occasion (PO) of the terminal, the second index represents an index of a terminal group to which the terminal belongs, and the first number represents a number of terminal groups; or the detection parameter of the terminal is determined based on the first index and a numerical value; or, the detection parameter of the terminal is determined based on the first index, a numerical value, the second index and a first number, wherein the numerical value represents a value determined by a system frame number of a paging frame (PF), a first time length and a second time length, the second index represents an index of a terminal group to which the terminal belongs, the first number represents a number of terminal groups, the first time length represents a time interval between adjacent signals or adjacent channels, and the second time length represents a time interval between adjacent PFs.

12. The non-transitory computer-readable storage medium of claim 11, wherein the detection parameter comprises at least one of:

a bit position;

a sequence cyclic shift;

a sequence index; or a monitoring occasion.

* * * * *